March 5, 1946.　　　　G. E. DUNN　　　　2,395,962
CONSTANT VELOCITY JOINT
Filed Nov. 30, 1944　　　2 Sheets-Sheet 1

INVENTOR.
George E. Dunn.
BY
Harness, Dickey & Pierce
ATTORNEYS.

March 5, 1946. G. E. DUNN 2,395,962
CONSTANT VELOCITY JOINT
Filed Nov. 30, 1944 2 Sheets-Sheet 2

INVENTOR.
George E. Dunn.
BY
Harness, Dickey & Pierce
ATTORNEYS.

Patented Mar. 5, 1946

2,395,962

UNITED STATES PATENT OFFICE 2,395,962

CONSTANT VELOCITY JOINT

George E. Dunn, Detroit, Mich., assignor to Universal Products Company Incorporated, Dearborn, Mich., a corporation of Delaware Application November 30, 1944, Serial No. 565,855

5 Claims. (Cl. 64—21)

The invention relates to universal joints and it has particular relation to a universal joint of constant velocity character. In certain respects, the invention is related to the improvements in universal joints embodied in the copending applications for patent of Richard B. Ransom, Serial No. 480,490, filed March 25, 1943, and Serial No. 493,873, filed July 8, 1943, and my copending application for patent Serial No. 570,233, filed December 29, 1944.

One object of the invention is to provide an improved type of constant velocity joint which may be manufactured and assembled efficiently and inexpensively.

Another object of the invention is to provide an improved type of constant velocity joint involving a minimum movement of parts which may be readily associated together.

Another object of the invention is to provide an improved type of constant velocity universal joint wherein the parts of the joint are centered in a simple and improved manner.

Other objects of the invention will become apparent from the following specification, from the drawings relating thereto, and from the claims hereinafter set forth.

For a better understanding of the invention reference may be had to the drawings herein:

Figure 1:
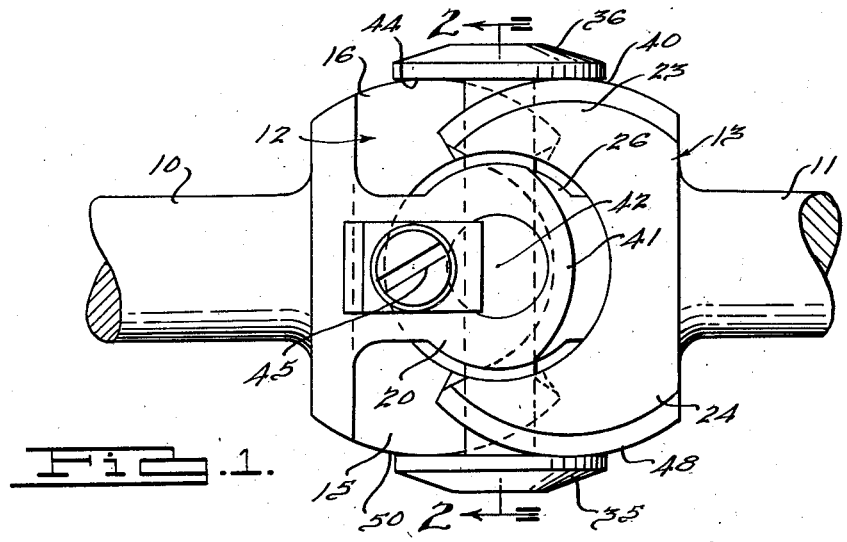
Figure 1 is a side view of a universal joint constructed according to one form of the invention.
Figure 2:
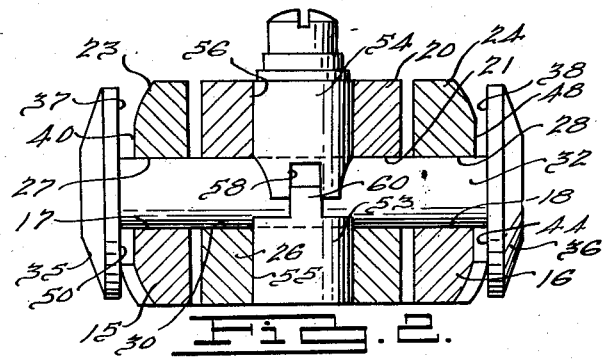
Fig. 2 is a cross-sectional view taken substantially along the line 2—2 of Fig. 1.

Referring to Figs. 1 and 2, the two shafts connected by the joint are indicated at 10 and 11 and these shafts respectively have yokes 12 and 13 on their adjacent ends. Yoke 12 includes arms 15 and 16 arranged in transversely aligned relation and provided with aligned flat surfaces 17 and 18 extending axially of the shaft. Also a third arm 20 on yoke 12 extends in the same direction as arms 15 and 16 but this third arm is intermediate to the other arms and is spaced therefrom. This third arm has a flat, axially extending surface 21.

The yoke 13 similarly has a pair of axially extending arms 23 and 24 which are like the arms 15 and 16 excepting that they extend in the opposite direction. A third arm 26 is also provided on the yoke 13 and this third arm is transversely intermediate to the arms 23 and 24 and is spaced therefrom. Flat surfaces 27 and 28 are provided on the inner side of the arms 23 and 24 and such surfaces are aligned transversely. The third arm 26 also has a flat surface 30 parallel to the other surfaces but spaced therefrom. It should now be evident that with the yokes in the position shown in Figs. 1 and 2, an axially directed slot is provided between the surfaces 17 and 27 and that similarly, a slot is provided between the surfaces 18 and 28 and between surfaces 21 and 30.

A third part of the joint includes a pin 32 extending through all of the slots and the diameter of this pin is substantially equal to the width of the slots so as to obtain a working fit between the pin and the several surfaces mentioned. It will be appreciated that with the two yokes arranged as seen in Fig. 2, the slot for the pin is definite fixed in width since each yoke has two arms on one side of the slot and a single arm on the other side. Generally speaking now, it is evident that if one shaft is turned as for instance the shaft 10, the yoke arms 15 and 16 in conjunction with the arm 20 will drive the pin 32 and the latter in turn will drive the yoke arms 23 and 24 and 26. Thus the second shaft will be driven also.

The means for obtaining constant velocity in the operation of the joint comprises end caps or heads 35 and 36 on the opposite ends of the pin 32 and these caps have flat under surfaces 37 and 38. As seen best in Fig. 1, the cap 36 is in tangential contact with an outer cylindrical surface 40 on the arm 23 and the center or axis of curvature of this surface as indicated at 41 intersects the center line or axis of the shaft 11 and is spaced from the center of the joint indicated at 42. Also the cap is in tangential contact with a cylindrical surface 44 on the arm 16 of yoke 12, and the center or axis of curvature of this surface indicated at 45 intersects the center line or axis of shaft 10 and is spaced from the joint center at the opposite side a distance equal to the distance between centers 41 and 42. The center line of 41 is on the center line 45, the center line 45 is on the center line of shaft 10 and the two centers 41 and 45 are equally spaced from the joint center 42 and are located at opposite sides thereof. The arms 24 and 15 have cylindrical surfaces indicated at 48 and 50 respectively, which are centered on axes 41 and 45 and such surfaces have tangential contact with the under surfaces of cap 35.

Assuming that the yoke arms are centered so that swinging of one yoke relative to the other will occur about the center 42, the tangential contacts between the surfaces and the caps on the ends of the pin 32 will cause the pin to shift through an angle which is only half as large as the angle between the shafts. It is evident that the caps can only maintain a tangential contact with the surfaces and it can be readily shown that this tangential contact occurs only when the axis of the pin 32 bisects the angle between the shafts. In this connection attention is directed to the copending application for patent of Richard Ransom Serial No. 480,490 which illustrates and describes the geometrical proof involved in illustration of the fact that the pin will swing through only half the angle between the shafts. With the pin 32 shifted into the bisecting position, the angular velocity of the shaft will be imparted in a constant manner to the other shaft so that if one shaft has a constant speed, the speed of the other shaft will also be constant.

Figure 5:
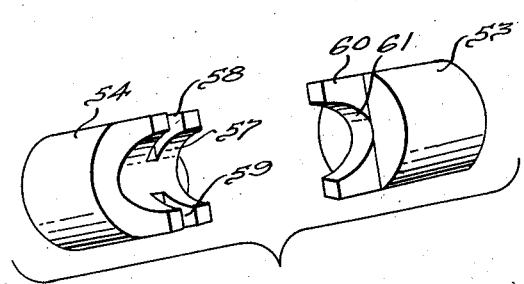
Fig. 5 is a detailed view illustrating the construction of the bearing elements which cooperate to center the yokes.

The joint is centered on the joint center 42 by means of bearing elements 53 and 54 which respectively are turnable in openings 55 and 56 provided in the yoke arms 26 and 20. Such bearing elements have inner surfaces substantially fitting the surface of the pin 32 and inner portions of the elements have an interlocking relation which may be best explained in connection with Fig. 5. As seen in this figure, the bearing element 54 has a curved inner surface 57 which fits the pin 32 and at opposite sides of the bearing element, slots 58 and 59 are provided through the curved surface. The bearing element 53 has a narrower portion 60 adapted to fit snugly but movably in the slots 58 and 59 and this narrower portion has a curved surface 61 also fitting the pin 32.

Figure 3:
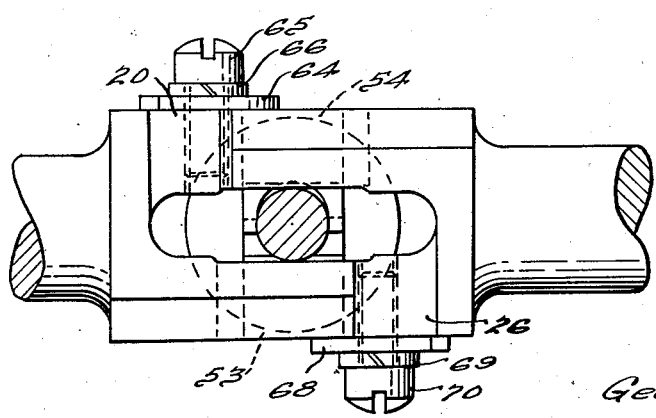
Fig. 3 is a plan view of the structure shown by Fig. 1 with the end cap on the cross pin removed for the purposes of illustration.
Figure 4:
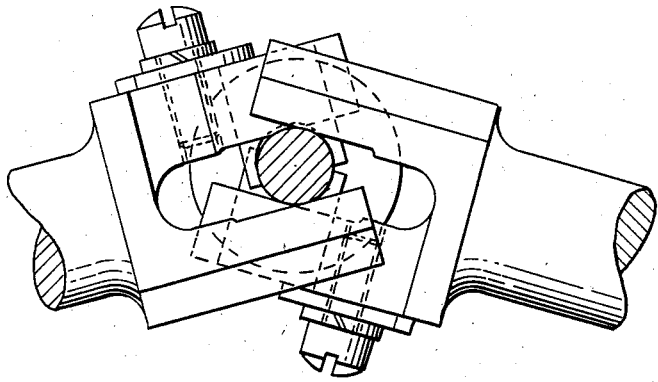
Fig. 4 is a view on the order of Fig. 3 illustrating parts of the joint as seen when one shaft is angled relative to the other.

The bearing element 54 as best seen by Fig. 3 is held in place by a plate 64 secured by a screw 65 to the base of the arm 20 and preferably a lock washer 66 will be used under the head of the screw 55 to prevent loosening. Similarly the bearing element 53 is held in place by a plate 68, a lock washer 69 and a screw 70 secured to the arm 26. From this it is apparent that the two bearing elements are held substantially in contact with the pin 32.

As best seen by Fig. 2, a substantial space exists between the circumferential ends of one bearing element and the circumferential ends of the other so as to permit swinging movement of either yoke relative to the other although it is evident that the limit of swinging movement may be governed by the width of this space. If one yoke is swung in one direction about the pin 32, the space between the bearing elements at one side will decrease while the space at the other side will increase. The design of the bearing elements, however, is such that even if they contact at one side through sufficient swinging movement of the yoke arm, the tongue 60 at the other side will still be partly in the slot 58 or 59 as the case may be. Therefore, these tongues remain engaged with the slots 58 and 59 through any permitted swinging movement of the yoke arms. As a result the bearing elements prevent any movement of either yoke arm axially of the pin relative to the other and accordingly the yoke arms are centered in this direction.

Axially of the joint, the bearing elements by their engagement with the pin 32 prevent either shaft from moving inwardly or outwardly relative to the other. From this it follows that when the parts are connected, a definite joint center indicated previously at 42 is obtained and this joint center is located at the intersection of the pin axis and the axis of the bearing elements, and the two axes of the shafts. While it does not appear that any further centering means is required housing or shell centering means may also be provided if desired as for instance has been disclosed in the pending application Serial No. 493,873.

Particular attention is directed to the fact that the joint may be easily manufactured and assembled. Either yoke arm may be manufactured without difficulty so as to provide the three arms with the required flat or cylindrical surfaces. The pin 32 may be made integral with the caps 35 and 36 or such parts may be put together after separate manufacture. Manufacturing of the bearing elements is not difficult. To assemble the yoke and the pin it is only necessary to place the pin in the slots between the arms of one yoke and then to insert the arms of the other yoke. Following this the two bearing elements 53 and 54 may be inserted and locked into place by the plate securing elements. In operation, tilting movement of either yoke about the axis of the bearing elements will result in the tilting movement of the pin 32 through half the angle between the shafts and at the same time the bearing elements 53 and 54 will turn about their own axes. Swinging movement of either yoke about the axis of pin 32 will result in the bearings 53 and 54 turning about the axis of pin 32 without disengaging the interlocking ends of the bearing elements. During such movements and in operation of the joint the caps 35 and 36 maintain tangential contact with the external surfaces of the arms so as to secure the constant velocity action.

Although only one form of the invention has been illustrated and described in detail it will be apparent to those skilled in the art that various modifications may be made without departing from the scope of the claims.

What is claimed is:

1. A constant velocity joint comprising a diametrically extending pin, a pair of three-arm yoke elements adapted to be connected to a pair of shafts respectively, one element having two arms substantially contacting the pin at the same side of the latter but adjacent its outer ends respectively and having its third arm substantially contacting the pin intermediate the ends of the latter but at the opposite side thereof, the other element having two arms disposed at said opposite side of the pin and substantially contacting the ends thereof respectively outwardly beyond the first mentioned third arm, the third arm on said other element substantially contacting the pin between the first mentioned two arms on the first element, means for moving the pin into a position where its axis substantially bisects the angle between the shafts when either shaft is angled relative to the other, a bearing element turnable in each third arm and having a curved inner end fitting the pin surface, and means interconnecting said ends of the bearing elements for preventing relative movement of either yoke axially of the pin during operation of the joint.

2. A constant velocity joint comprising a diametrically extending pin, a pair of three-arm yoke elements adapted to be connected to a pair of shafts respectively, one element having two arms substantially contacting the pin at the same side of the latter but adjacent its outer ends respectively and having its third arm substantially contacting the pin intermediate the ends of the latter but at the opposite side thereof, the other element having two arms disposed at said opposite side of the pin and substantially contacting the ends thereof respectively outwardly beyond the first mentioned third arm, the third arm on said other element substantially contacting the pin between the first mentioned two arms on the first element, means for moving the pin into a position where its axis substantially bisects the angle between the shafts when either shaft is angled relative to the other, a bearing element turnable in each third arm and having a curved inner end fitting the pin surface, and means interlocking the bearing elements so that each can swing relative to the other about the pin axis but cannot move axially of the pin relative to the other.

3. A constant velocity joint comprising a diametrically extending pin, a pair of three-arm yoke elements adapted to be connected to a pair of shafts respectively, one element having two arms substantially contacting the pin at the same side of the latter but adjacent its outer ends respectively and having its third arm substantially contacting the pin intermediate the ends of the latter but at the opposite side thereof, the other element having two arms disposed at said opposite side of the pin and substantially contacting the ends thereof respectively outwardly beyond the first mentioned third arm, the third arm on said other element substantially contacting the pin between the first mentioned two arms on the first element, means for moving the pin into a position where its axis substantially bisects the angle between the shafts when either shaft is angled relative to the other, a bearing element turnable in each arm about a fixed axis crosswise of the pin and having a curved inner end fitting the pin surface, and means including tongues and slots interlocking inner ends of the elements so that each element can swing relative to the other about the pin axis while holding the two fixed axes in such relation that they intersect each other on the pin axis.

4. A constant velocity joint comprising a diametrically extending pin, a pair of three-arm yoke elements adapted to be connected to a pair of shafts respectively, one element having two arms substantially contacting the pin at the same side of the latter but adjacent its outer ends respectively and having its third arm substantially contacting the pin intermediate the ends of the latter but at the opposite side thereof, the other element having two arms disposed at said opposite side of the pin and substantially contacting the ends thereof respectively outwardly beyond the first mentioned third arm, the third arm on said other element substantially contacting the pin between the first mentioned two arms on the first element, means for moving the pin into a position where its axis substantially bisects the angle between the shafts when either shaft is angled relative to the other, each of said third arms having a cylindrical bore with the axis of the bore at right angles to the pin axis, a bearing element turnably fitting said bore and having its inner end face formed to define a partially cylindrical recess having a bearing fit with a circumferentially extending portion of the pin, and means interlocking the inner ends of the pins to allow relative swinging movement thereof about the axis of the pin while maintaining the axes of the bearing elements in a single plane radial to the pin axis.

5. A constant velocity joint comprising a diametrically extending pin, a pair of three-arm yoke elements adapted to be connected to a pair of shafts respectively, one element having two arms substantially contacting the pin at the same side of the latter but adjacent its outer ends respectively and having its third arm substantially contacting the pin intermediate the ends of the latter but at the opposite side thereof, the other element having two arms disposed at said opposite side of the pin and substantially contacting the ends thereof respectively outwardly beyond the first mentioned third arm, the third arm on said other element substantially contacting the pin between the first mentioned two arms on the first element, means for moving the pin into a position where its axis substantially bisects the angle between the shafts when either shaft is angled relative to the other, each of said third arms having a cylindrical bore with the axis of the bore at right angles to the pin axis, a bearing element turnably fitting said bore and having its inner end face formed to define a partially cylindrical recess having a bearing fit with a circumferentially extending portion of the pin, and means interlocking the bearing elements at the circumferential ends of the cylindrical recesses therein to allow relative swinging movement thereof about the pin axis while maintaining the axes of the bearing elements in a single plane radial to the pin axis, the interlocking means on the adjacent circumferential ends at each side of the pin comprising a key portion on one bearing element and a slot in the other extending circumferentially of the pin and which receives the key portion.

GEORGE E. DUNN.